No. 792,400. PATENTED JUNE 13, 1905.
R. L. CORBY.
BAKER'S PEEL.
APPLICATION FILED DEC. 31, 1902.
2 SHEETS—SHEET 1.
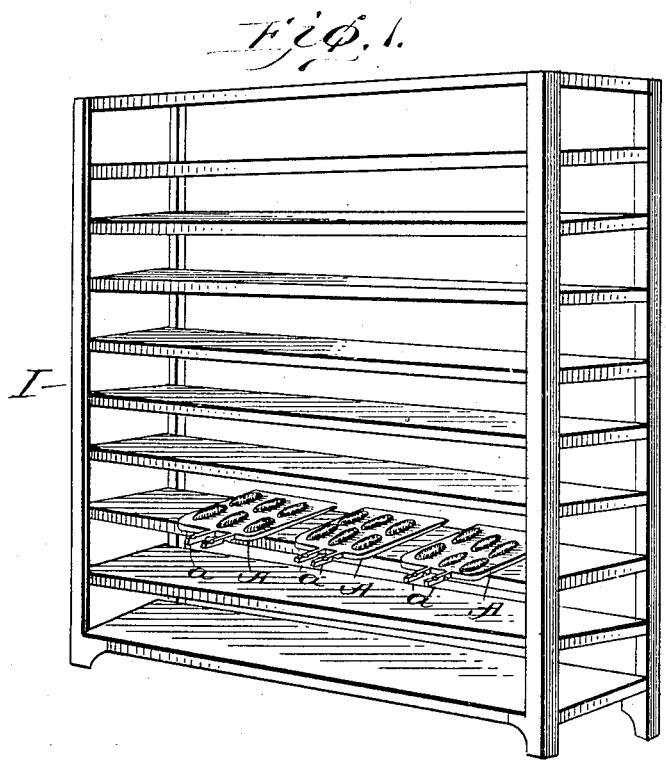
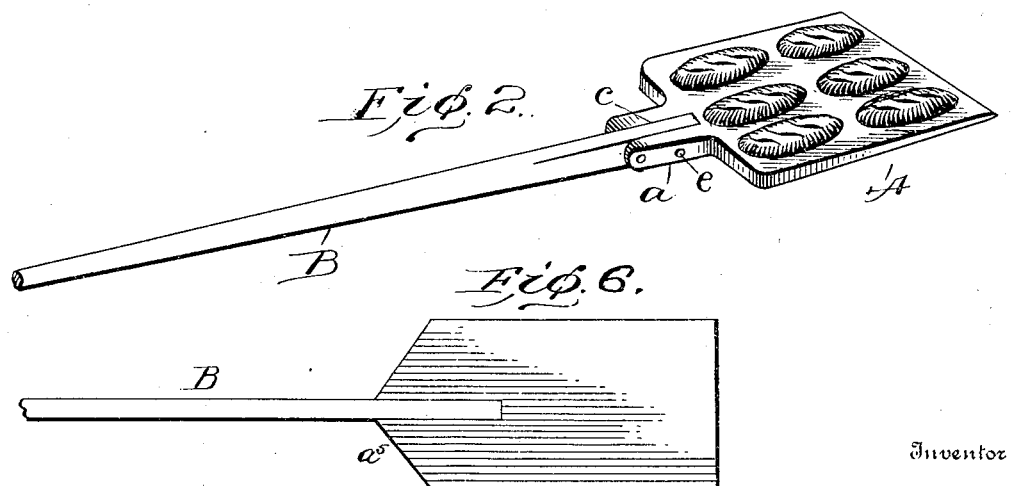
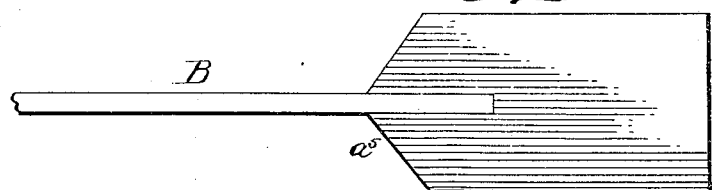
Witnesses
J. M. Fowler Jr.
Geo. B. Pitts
Inventor
Robert L. Corby
By J. S. Barker
his Attorneys No. 792,400. PATENTED JUNE 13, 1905.
R. L. CORBY.
BAKER'S PEEL.
APPLICATION FILED DEC. 31, 1902.
2 SHEETS—SHEET 2.
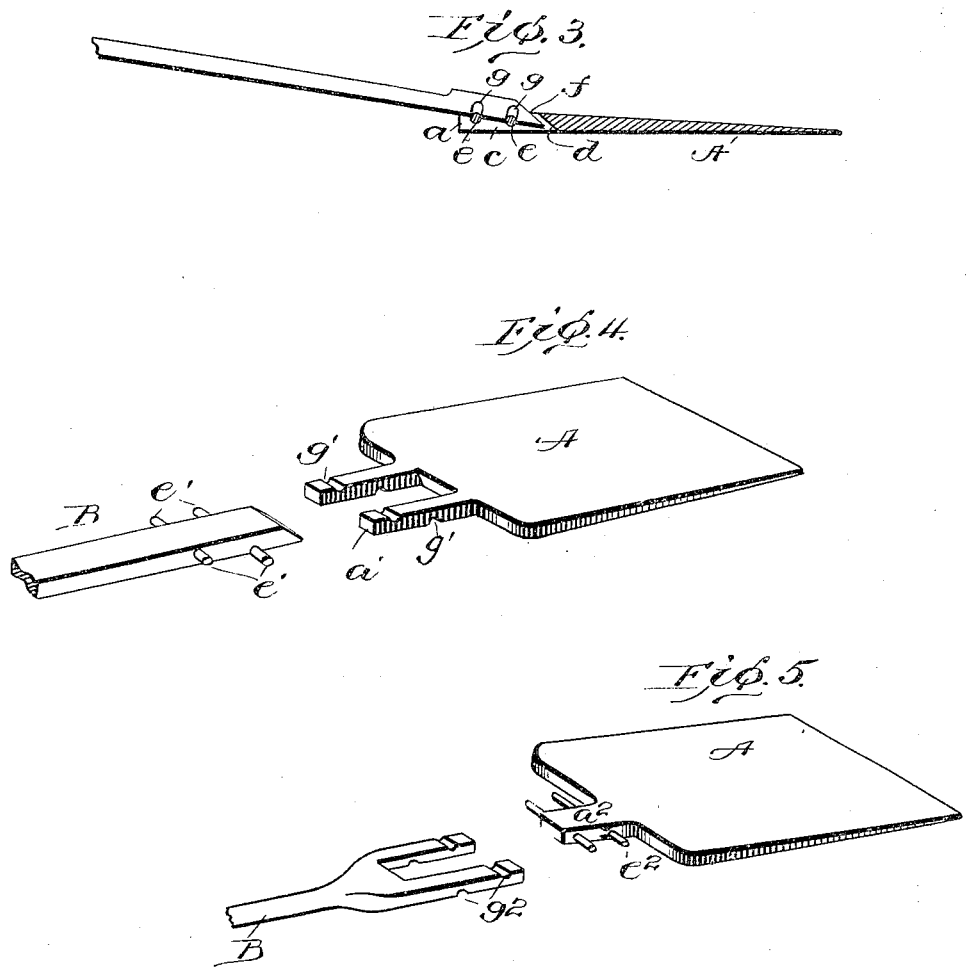

No. 792,400.

Patented June 13, 1905.

UNITED STATES PATENT OFFICE.

ROBERT L. CORBY, OF WASHINGTON, DISTRICT OF COLUMBIA.

BAKER'S PEEL.

SPECIFICATION forming part of Letters Patent No. 792,400, dated June 13, 1905.

Application filed December 31, 1902. Serial No. 137,326.

*To all whom it may concern:*

Be it known that I, ROBERT L. CORBY, a citizen of the United States, residing at Washington, in the District of Columbia, have invented a new and useful Baker's Peel, of which the following is a specification.

In the manufacture of many kinds of bread—as, for instance, rye bread and French and Vienna bread—it is customary to bake the loaves directly upon the bottom or hearth of the oven as distinguished from baking it in pans, the shape of the loaves making it necessary or desirable that they should be baked in this manner. It is also the custom to place such loaves after they have been molded in wooden boxes or trays and to separate and cover them by cloths for proofing. This method of procedure is objectionable in several particulars. In the first place an unnecessary amount of handling is required, as the loaves must be taken from the proofing-boxes or trays and placed upon the peel before they can be inserted into the oven, and, again, the covering of the loaves with cloths requires considerable time and is undesirable, as the cloths soon become soiled. It is also necessary that the cloths should be dry or else the dough will stick to them; but this is an objection, for the reason that the presence of the dry cloth next to the loaf during the proofing process results in unduly drying the surface of the dough loaf, with the result that a sort of crust or relatively dry skin is formed that operates to resist and to a certain degree to retard the expansion of the loaf, particularly when it is placed in the oven. In many kinds of bread, such as French bread, it is a desideratum to secure as large a loaf expansion as possible, and therefore the drying of the outer surface of the dough loaf by reason of the separating-cloth referred to is an objection. Again, it is customary to cut the loaves before they are baked to give them distinctive markings, and such cutting in the ordinary manner of procedure must be done by a skilled workman and at the time the loaves are placed upon the peel after the proofing of the loaves is complete and just before they are inserted in the oven. I have found that it is desirable to cut the loaves when the proofing is about half advanced, as then the crust of the baked loaf is much smoother than when the cutting is done at the time the bread is ready to be placed in the oven and the appearance of the baked loaves is much improved; but heretofore it has not been practicable to cut the dough loaves at such time because of their being in the proofing-trays and covered by the cloths used to separate the loaves. By my invention I am enabled to save one handling of the loaves, and that the handling at the most critical stage—namely, when they are fully proofed—and I am enabled to cut the loaves during the proofing process, which can then be done by an unskilled workman. These advantages I am enabled to secure by the use of an improved form of peel, which constitutes the subject of the present invention.

In the accompanying drawings, Figure 1 is a perspective view of a bread-rack containing a number of peels made according to my invention, upon which are supported dough loaves, the whole being ready to be run into the proofing-room. Fig. 2 is a perspective view of a peel with a detachable handle applied, the loaves represented in Fig. 1 being now ready to be inserted in the oven. Fig. 3 is a longitudinal sectional view of the form of invention shown in Figs. 1 and 2, the handle being in position to be detached. Figs. 4 and 5 are perspective views illustrating different forms of peels embodying my invention, a portion of the detachable handle used with each peel being shown. Fig. 6 is a plan view of a somewhat different form of peel from that illustrated in the other views.

The blade A of the peel may be of any usual or preferred construction and configuration. It differs from the ordinary peel in that it is easily separable from the handle B, the handle and blade being provided with interengaging parts of such a nature as to permit them to be connected so that the peel as a whole may be used as the ordinary baker's peel. For some reasons I prefer that form of the invention illustrated in Figs. 1, 2, and 3. As therein shown, the blade is provided with a rearward-extending projection $a$, adapted to serve as a handle for the blade when the latter is used without its long detachable handle B. This projection also serves as the means for uniting the handle and the blade. In the specific form of invention being described the projection a is provided with a longitudinal slot c, the front wall d of which is undercut or beveled, as clearly represented in Fig. 3. One or more cross-pieces e are mounted in the slot c and extend across the same. The long detachable handle B, by means of which the peel is manipulated for placing the loaves in the oven and removing them therefrom, is constructed at its front end to engage with the blade, having, in the form of invention being described, its front end beveled, as indicated at f, to fit the beveled face d at the forward end of the slot formed in the rearward extension a of the peel-blade. It is likewise provided with one or more transverse grooves or recesses g, adapted to engage with the cross-rods e. It will be readily seen, especially by reference to Fig. 3, that the handle may be easily applied to or removed from the blade, it being only necessary to tilt the rear end of the handle upward slightly to permit its forward end to be inserted into or removed from the slot c. When such end of the handle is inserted in the slot and the handle brought down into a horizontal plane coincident with that of the blade, the parts are locked together, and the complete implement may be manipulated with as much freedom as can the ordinary peel in which the handle is permanently secured to the blade.

My invention is susceptible of many modifications, several of which are illustrated. Referring to the form of invention shown in Fig. 4, it will be seen that the invention is in many respects similar to that shown in Fig. 3. It differs, however, in that the cross-rods $e'$ are carried by the handle B and are arranged to engage with grooves or recesses $g'$, formed in the slotted rearward extension $a'$ of the blade.

In the form of invention shown in Fig. 5 the rearward extension $a^2$ of the blade is not slotted; but instead the forward engaging end of the handle B is slotted or bifurcated and arranged to straddle the said extension $a^2$ of the blade. In this case the cross bars or rods $e^2$ are carried by the extension $a^2$, and the grooves $g^2$, with which they engage, are formed in the forward end of the detachable handle.

I will now describe the manner in which I use my invention. I may employ a large number of blades A of any of the forms described or of any analogous construction, and upon these I place the molded loaves of dough, as represented in Fig. 1, leaving them (the dough loaves) thereupon during the proofing process and until they are ready to be placed in the oven. These peel-blades are used instead of proofing boxes or trays and are placed in the racks I, Fig. 1, that are run into the proofing-room when properly filled. At the proper time during the proofing process and preferably when the proofing is about one-half advanced the attendant cuts the surface of the dough loaves in order to give to the baked loaves such distinctive markings as custom or the practice of the shop may call for. After the proofing is completed the rack is run up to the oven and the loaves are delivered directly from the peel-blades, upon which they were placed at the time of molding, into the oven. The detachable handle now is brought into requisition, a single handle only sufficing for any number of blades that may be used. The particular methods of connecting the handles and the blades illustrated in the drawings permit of very rapid connection and separation of these parts.

The projections or extensions at the rear of the blades, whether of one or another of the forms shown, serve as handles that are used in handling the blades when they are placed upon or removed from the racks or are otherwise used prior to having the detachable handle B applied. However, it is not necessary that the rear extension should be shaped so as to serve as a handle, as is apparent from an examination of Fig. 6, wherein is shown a form of peel adapted to receive a detachable handle and in which the portion $a^5$, with which the handle B engages, is but little reduced in width as compared with the blade proper. I prefer, however, the forms shown in the other views, as it makes a lighter and more shapely peel, and also, as has been stated, it enables the extension to be used as a handle when the peel is detached from the long handle B.

I am aware that various articles have been provided with easily separable or detachable handles, and therefore do not lay claim to this feature broadly. A baker's peel differs from all articles of which I am aware in several respects, and notably, first, because of its extreme thinness relative to its size, and, secondly, because of the extremely long handle that is employed. These two characteristics of the peel make all contrivances heretofore invented for providing household and and other articles with detachable handles inapplicable to peels. The connection of the handle with the peel-blade should be strong and well braced, so as to permit the certain and positive manipulation of the peel in a baker's oven at a distance far from the operator and under the conditions where the accidental separation of the parts would be exceedingly troublesome. By slotting one of the parts, either the handle or the blade, and inserting a portion of the other part into such slot, the necessary side bracing and lateral connection is secured. It is equally desirable that the blade and handle should be capable of separation by a very slight movement of the handle, preferably a vertical movement, and this is secured by providing one of the interengaging parts of the peel with cross bars or members adapted to enter open grooves, as illustrated in those forms of my invention particularly shown in Figs. 3, 4, and 5. Another matter for which provision should be made is the storing of the peel-blades when not in use. Obviously the economical manner of storage is by piling them one upon another, and to permit this the engaging parts for the detachable handle should not project beyond the planes of the opposite faces of the board. This feature is secured in the preferred forms of my invention.

The advantages incident to my invention are many, and some of them have been already referred to. They may be summed up as follows: The invention results in a saving in the handling of the dough loaves, particularly at the time when they are proofed and ready for insertion in the oven, the time when the dough is in the most delicate condition and can least well afford to be handled. It enables the baker to dispense with the use of cloths for separating and wrapping the loaves, as is required when the ordinary proofing-trays are employed, thus tending to cleanliness and healthfulness. The invention also results in a distinct improvement in the baked product by permitting the cutting of the loaves before they are fully proofed and while lying upon the peel-blades. The work at such time can be performed by an ordinary baker, whereas the proper cutting of the fully-proofed loaf required an unusual degree of skill to give a satisfactory appearance to the loaf and prevent its being injured by such cutting, and the invention also permits the formation of a loaf of bread baked upon the hearth, the crust of which is so thin as to permit full expansion of the loaf under the action of the ferment employed.

Having described my invention, what I claim, and desire to secure by Letters Patent, is—

1. A baker's peel, comprising a blade with a rearward-extending portion, and a separable handle arranged to be engaged therewith, one of these parts being longitudinally slotted and the other arranged to enter and closely fit within the slot, whereby they laterally brace each other, and one of the parts being provided with transversely-disposed lugs and the other with open recesses to receive the lugs, the lugs and recesses being arranged substantially as set forth, whereby they may be brought into engagement and be separated by relatively slight up-and-down movements of the handle as described.

2. The combination of a blade A, provided with a rearward extension in which is formed a slot that terminates at its forward end in a beveled or undercut face or wall, a detachable handle constructed to enter and closely fit within the said slot and having its forward end beveled to fit the undercut wall at the end of the slot in the blade, and a cross-piece arranged to unite the handle and the blade when these parts are in operative positions, substantially as set forth.

ROBERT L. CORBY.

Witnesses:
J. S. BARKER,
THOMAS P. WOODWARD.